United States Patent
DiCarlo

(10) Patent No.: US 6,872,161 B2
(45) Date of Patent: Mar. 29, 2005

(54) MODULAR GEAR SYSTEM FOR PUMP

(75) Inventor: Leonard J. DiCarlo, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 10/402,457

(22) Filed: Mar. 28, 2003

(65) Prior Publication Data

US 2004/0192490 A1 Sep. 30, 2004

(51) Int. Cl.$^7$ ............................................... F16H 48/06
(52) U.S. Cl. ..................... 475/149; 29/893.1; 74/606 R
(58) Field of Search ..................... 475/149; 29/893.1; 74/606 R; 417/555.1, 460, 468

(56) References Cited

U.S. PATENT DOCUMENTS

| | | | |
|---|---|---|---|
| 3,241,397 A | * | 3/1966 | Wilkinson ................ 74/606 R |
| 3,290,962 A | | 12/1966 | McCann et al. |
| 4,441,378 A | * | 4/1984 | Ponczek ..................... 74/414 |
| 4,617,839 A | | 10/1986 | Matoba |
| 4,674,360 A | | 6/1987 | Matoba |
| 4,825,727 A | | 5/1989 | Komuro |
| 4,901,602 A | | 2/1990 | Matoba |
| 5,098,358 A | | 3/1992 | Igaku |
| 5,209,708 A | | 5/1993 | Igaku |
| 6,102,676 A | | 8/2000 | DiCarlo |

FOREIGN PATENT DOCUMENTS

WO   WO 00/11372   3/2000

* cited by examiner

Primary Examiner—Dirk Wright
(74) Attorney, Agent, or Firm—Senniger Powers

(57) ABSTRACT

A modular gear system for transmitting power from a motor to a device such as a pump which requires power to operate. The system includes a gearbox and first and second planetary gearset assemblies connectable between an output shaft of the motor and a drive shaft of the pump. The system may be configured as either a single-stage mode wherein the first gearset assembly is received in the gearbox to produce a rotational speed adjustment between the shafts, or a multi-stage mode wherein both the first and second gearset assemblies are received in the gearbox and are connected in series to produce a different rotational speed adjustment. The system provides flexibility for different speed and power requirements and is adaptable to a variety of motors.

24 Claims, 11 Drawing Sheets

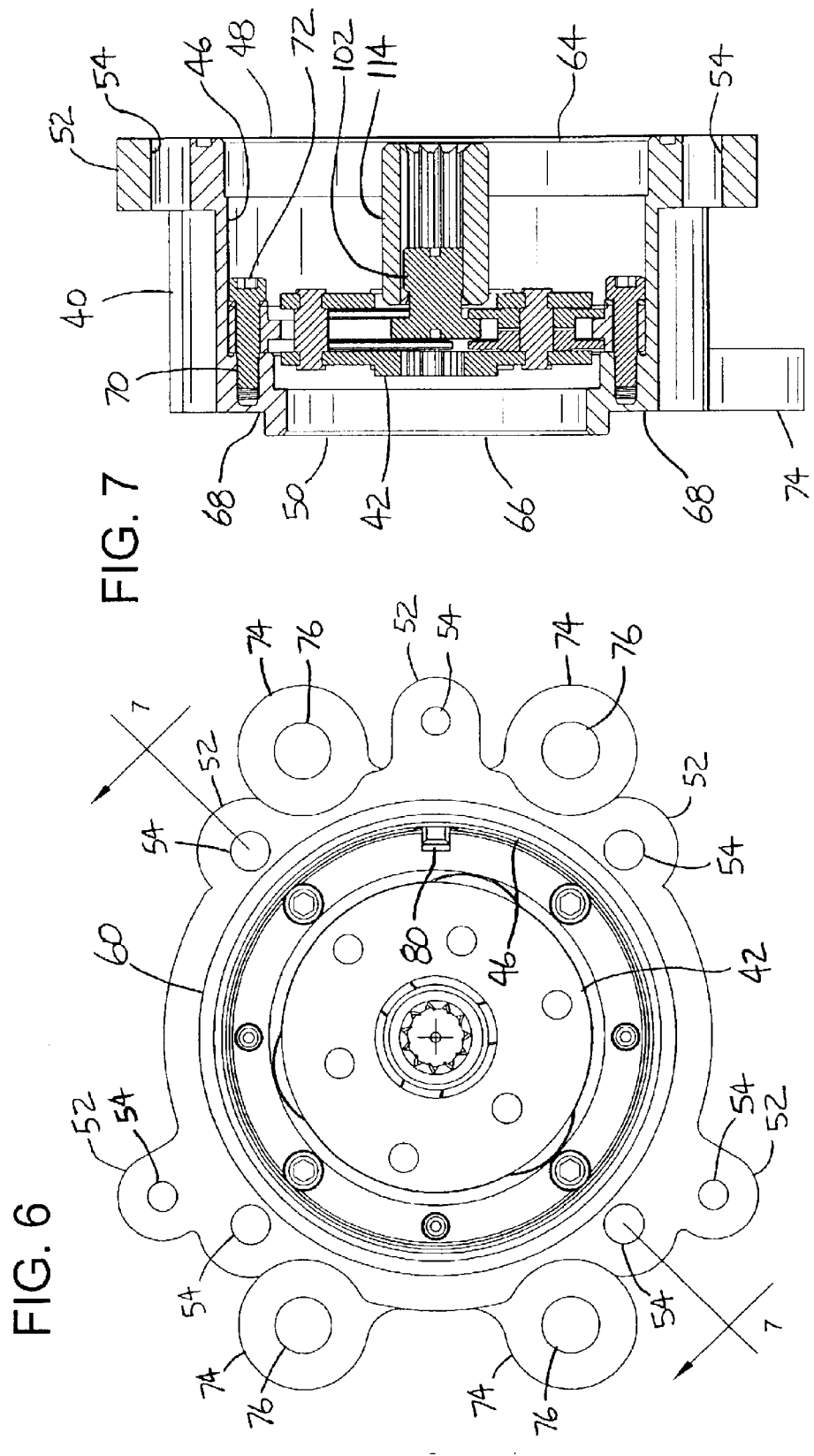

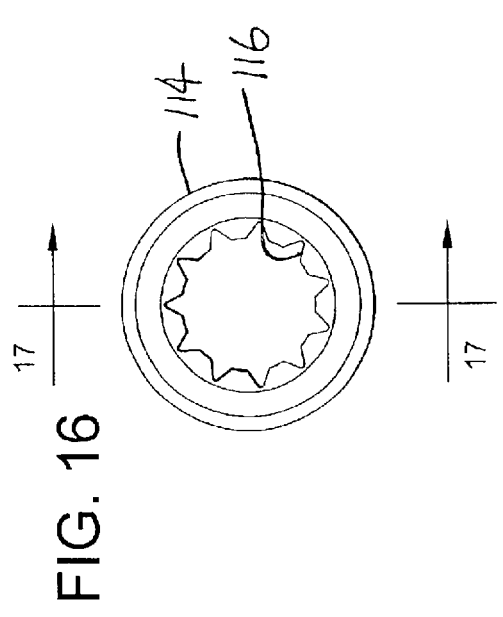
FIG. 16
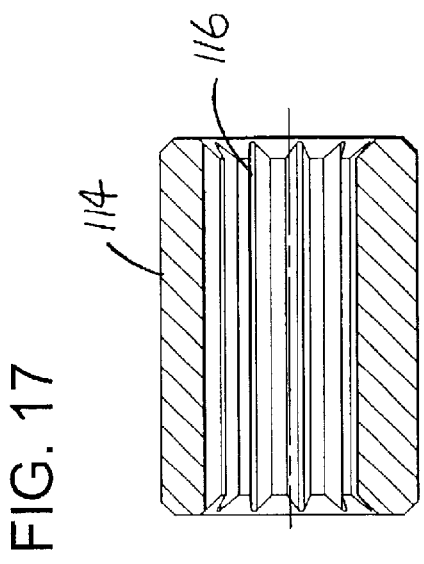
FIG. 17
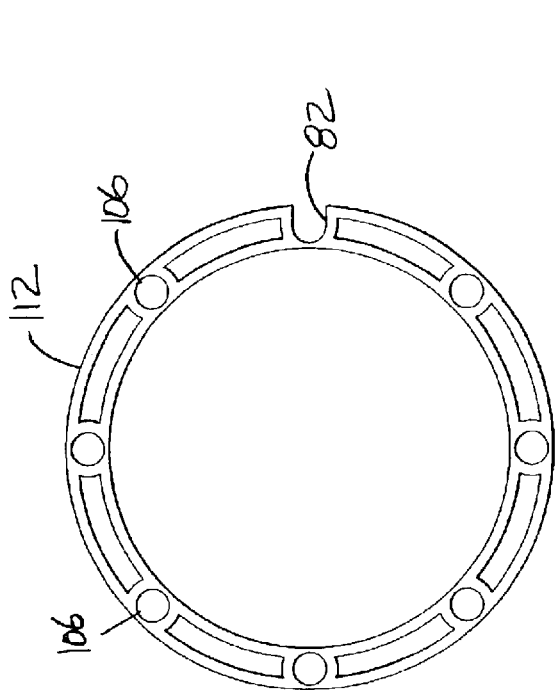
FIG. 15
FIG. 14

MODULAR GEAR SYSTEM FOR PUMP

BACKGROUND OF THE INVENTION

This invention relates generally to gearing for changing the rotational speed of a mechanism, and in particular to a modular gear system for a pump which provides flexibility in selection of gear reduction ratios and drive motors.

Mechanical pumps for delivering a fluid are used in a variety applications which may require operation with a variety of power sources. For example, pumps located at an industrial facility can be efficiently powered by alternating current (AC) electrical drive motors. Pumps which are mounted on mobile construction or mining equipment can be required, depending on availability, to be powered by brush-type direct current (DC) electrical motors, brushless DC electrical motors, or hydraulic motors. Typically, these motors have different operating characteristics, particularly rotational speed for a given power level. Moreover, pumps must meet a wide diversity in power and torque requirements depending on a particular functional application, flowrate demand, viscosity of fluid pumped, and range of operating temperatures. The requirements are not always known in advance.

Ideally, pumps should be adaptable for attachment to diverse group of power sources. Unfortunately, many pumps have not been adaptable in this manner and have consequently been limited in application. Typically, a rotary drive shaft receives power and torque from the motor for transmission to the pump. An intermediate gear system reduces the rotational speed supplied by the motor to the rotational speed required by the pump. Because of the wide ranges between these parameters, previous pumps have typically included motor-specific gear systems. That degrades flexibility with respect to use of the pump for a variety of applications and with a variety of motors.

SUMMARY OF THE INVENTION

Among the several objects and features of the present invention may be noted the provision of a gear system which transmits power and which provides different reductions for variant speed and power requirements; the provision of such a gear system which is adaptable to a variety of motors; the provision of such a gear system which is modular for one stage or multi-stage operation; the provision of such a gear system which inhibits wear; and the provision of such a gear system which is reliable in operation.

In general, a modular gear system of the present invention transmits power from a motor having a rotary output shaft to a device which requires power and has a rotary drive shaft. The system comprises a gearbox adapted to be mounted generally adjacent the motor and the device, the gearbox defining a cavity. A first gearset assembly is receivable in the cavity and operatively connectable between the motor output shaft and the drive shaft of the device for transmitting power from the output shaft to the drive shaft and producing a first rotational speed adjustment between the shafts such that the drive shaft rotates at a different rotational speed than the motor output shaft. A second gearset assembly is receivable in the cavity and operatively connectable in series with the first gearset for transmitting power and producing a second rotational speed adjustment. The system may be configured in either 1) a single-stage mode wherein the first gearset assembly and not the second gearset assembly is received in the cavity to produce the first rotational speed adjustment, or 2) a multi-stage mode wherein both the first and second gearset assemblies are received in the cavity and are operatively connected in series between the motor output shaft and the drive shaft of the device to produce a rotational speed adjustment which combines the first and second adjustments.

In another aspect, a method of the present invention changes a mode of operation of a gear system to alter a rotational speed adjustment provided by the gear system in transmitting power between a rotary output shaft of a motor and a rotary drive shaft of a device which requires power. The gear system comprises a gearbox fastened to the motor defining a cavity containing at least one gearset assembly. The method comprises the steps of unfastening the gearbox from the motor to provide access to the cavity and changing the rotational speed adjustment provided by the gear system. One or more gearset assemblies are installed in the cavity in series with at least one gearset assembly to thereby increment a number of gear stages, or at least one gearset assembly of two or more gearset assemblies is removed from the cavity to thereby decrement a number of gear stages. A gear assembly in the cavity is coupled with the output shaft of the motor or an output shaft of a different motor. The gearbox is fastened to the motor or to the different motor.

Other objects and features of the present invention will be in part apparent and in part pointed out hereinafter.

BRIEF DESCRIPTION OF THE DRAWINGS

FIG. 6 is an end elevation of the gear system in a single-stage mode;

FIG. 7 is a section along line 7—7 of FIG. 6;

FIG. 14 is an end elevation of a gearset spacer;

FIG. 15 is a side elevation of the gearset spacer of FIG. 14;

FIG. 16 is an end elevation of an adapter for connecting the motor to the first gearset assembly in the single-stage mode;

FIG. 17 is a section on line 17—17 of FIG. 16;

Corresponding reference characters indicate corresponding parts throughout the views of the drawings.

DETAILED DESCRIPTION OF THE PREFERRED EMBODIMENT

Figure 1:
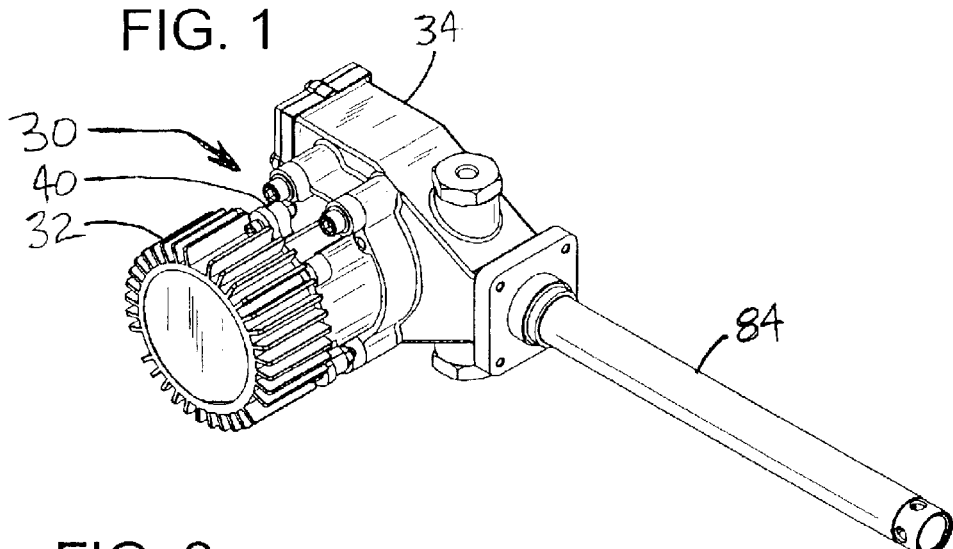
FIG. 1 is a perspective of one embodiment of a gear system according to the present invention in assembly with a pump and a motor.
Figure 4:
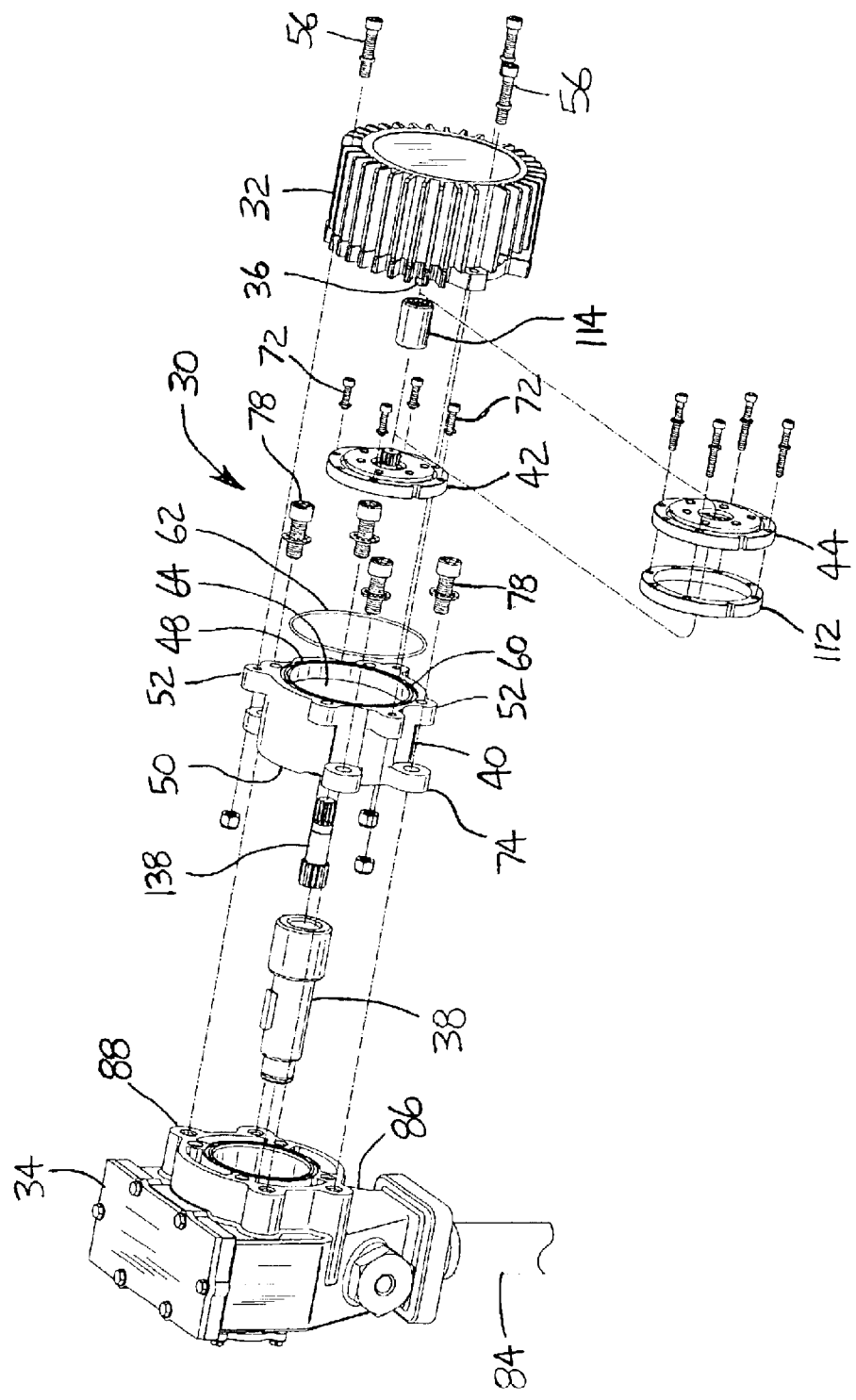
FIG. 4 is an exploded fragmentary perspective showing component parts of the gear system.

Referring now to the drawings and in particular to FIGS. 1 and 4, an embodiment of a modular gear system according to the present invention is indicated generally at 30. The gear system 30 transmits power from a motor 32 to a device 34 requiring power to operate. In the illustrated embodiment, the device 34 comprises a pump. However, it is understood that the device can be any type of device which requires power without departing from the scope of the present invention. The gear system 30 is operatively connected between a rotary output shaft 36 of the motor and a rotary drive shaft 38 of the pump. It produces adjustments in rotational speed and torque between the shafts such that the drive shaft 38 rotates at a different rotational speed than the motor output shaft 36 and carries a different torque. The gear system 30 includes a gearbox 40, a first gearset assembly 42 (e.g., a planetary type gearset assembly), and an optional second gearset assembly 44.

Figure 2:
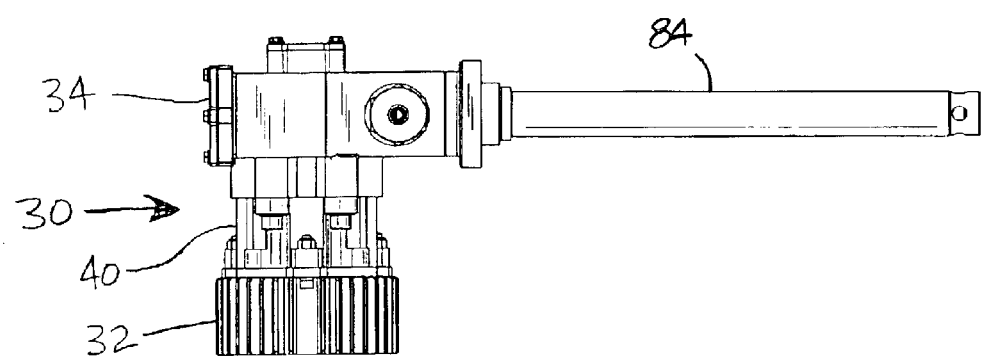
FIG. 2 is a plan view of the assembly of FIG. 1.
Figure 3:
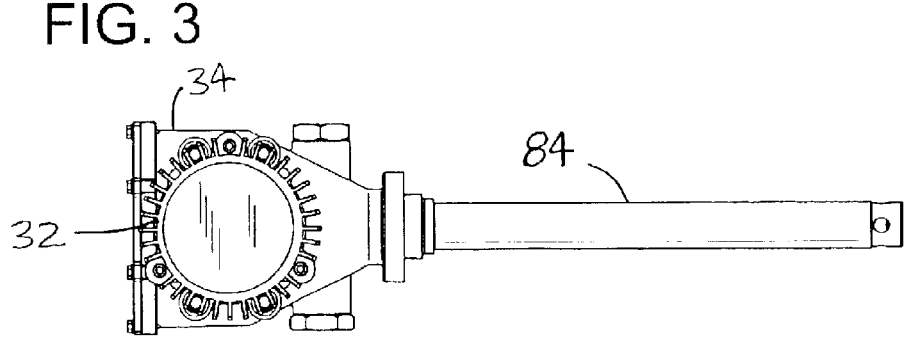
FIG. 3 is an elevation of the assembly of FIG. 1.

The gearbox 40 comprises a housing having a generally cylindric interior wall 46 (FIG. 7) which defines a cavity within the gearbox. As explained hereinafter, the gearbox provides a common housing for alternatively one, two, or more gearset assemblies. A first end 48 of the gearbox is adapted to be mounted to the motor 32, and a second end 50 is adapted to be mounted to the pump 34. When so mounted (as shown in FIGS. 1–3), the gear system 30, motor 32, and pump 34 are arranged into a compact assembly. The gearbox 40 is preferably a one-piece casting made of a suitable rigid material such as an aluminum alloy. Weight-reducing voids (not shown) may be placed in the gearbox 40 at locations which are lightly loaded such that a lack of material at the voids does not degrade structural integrity of the gearbox.

Figure 22:
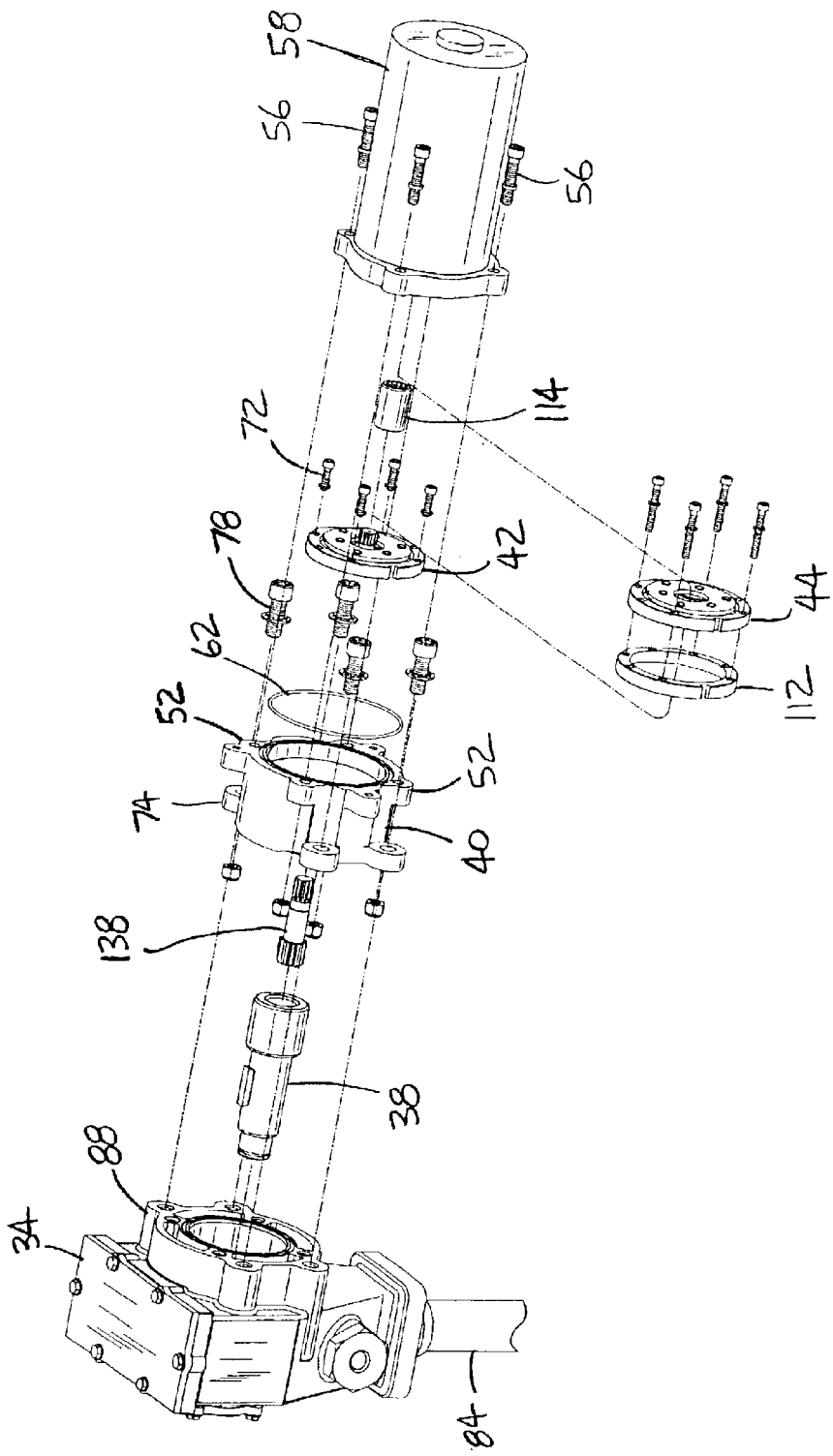
FIG. 22 is an exploded view similar to FIG. 4 but having a different type of motor.

The motor end 48 of the gearbox (FIGS. 6 and 7) has mounting formations 52 comprising protuberances with openings 54 for receiving fasteners 56 (FIG. 4) to attach the gearbox to the motor. The formations 52 are arranged in two different mounting configurations corresponding to two different motors. In the particular embodiment shown in FIGS. 4 and 6, a triangular arrangement (120 degree separation) of mounting formations 52 receives three fasteners 56 and mounts the gearbox to a DC motor 32. That arrangement corresponds with an exemplary DC motor, specifically a Series 34 or 36 permanent magnet brushless motor sold by the Motor Appliance Corporation, Brushless Motor Company of St. Louis, Mo., USA. Referring to FIG. 22, a rectangular arrangement (90 degree separation) of mounting formations 52 receives four fasteners 56 and mounts the gearbox to an AC motor 58. That arrangement corresponds with an exemplary AC motor, specifically an AC motor sold by the Marathon Electric Manufacturing Corporation of Wausau, Wisc., USA. Other arrangements of formations 52 or a single common arrangement which fits both DC and AC motors may be used without departing from the scope of this invention.

The motor end 48 of the gearbox housing 40 has a channel 60 (FIGS. 4 and 6) suitable for receiving an O-ring seal 62 engageable with an outer casing of the motor 32. A generally circular opening 64 in the motor end 48 of the gearbox housing is sized for facilitating ready insertion or removal of gearset assemblies 42, 44 in or from the cavity when the gearbox is separated from the motor.

The pump end 50 of the gearbox housing 40 has a generally circular opening 66 smaller than the opening at the motor end. A mounting rim 68 adjacent the opening 66 has several threaded fastener openings 70 for receiving fasteners 72 (FIG. 4) for securing the first gearset assembly 42 in the gearbox. Four mounting ears 74 with openings 76 for receiving fasteners 78 project laterally from the pump end 50 of the housing to attach the gearbox to the pump. A rectangular key 80 (FIG. 6) extends axially along the interior wall 46 of the cavity for aligning with a corresponding keyway 82 on each gearset assembly 42, 44 and preventing rotation of the gearset assembly relative to the gearbox 40. It is understood that a gear system which has a different type or shape of housing or mounting arrangement, or which is not mounted directly to the motor or pump does not depart from the scope of this invention.

Figure 5:
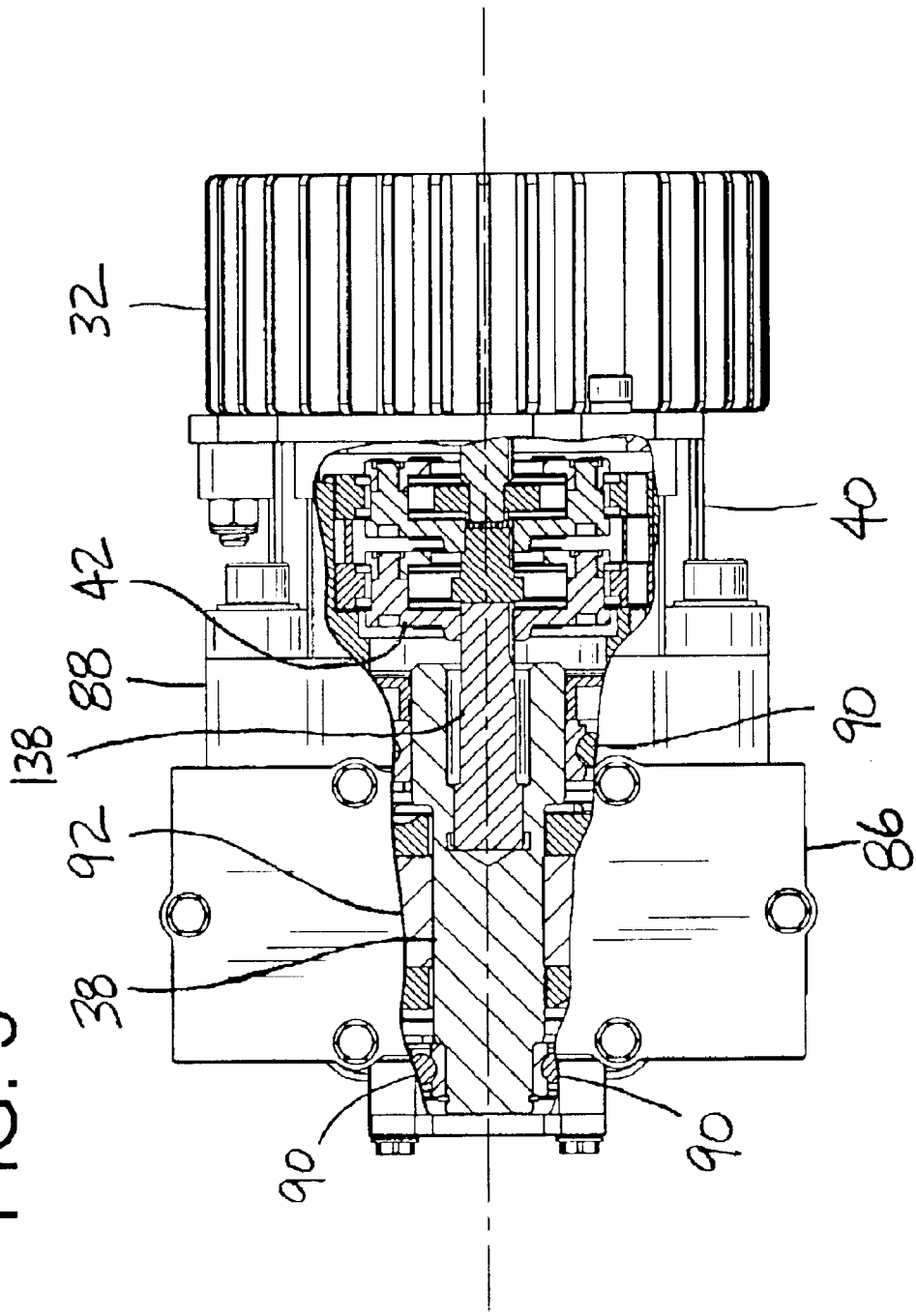
FIG. 5 is an end elevation of the assembly of FIG. 1 with portions broken away.

The pump 34 of the illustrated embodiment functions to deliver lubricant from a reservoir (not shown) to any mechanism requiring lubrication. The pump is reciprocally movable through a pump stroke and has a lance 84 which extends into a supply of a pumpable product for pumping the product. The pump 34 has a pump housing 86 having an integral mounting formation 88 (FIG. 4) to which the gearbox 40 can be fastened. The drive shaft 38 is supported for rotation on bearings 90 in the housing (FIG. 5) and is connected to an eccentric 92 which reciprocates a pump tube (not shown) relative to a fixed plunger to deliver metered charges of lubricant. For further detail regarding the construction and operation of this pump, reference may be made to U.S. Pat. No. 6,102,676, issued Aug. 15, 2000 and entitled "Pump," which is hereby incorporated herein by reference. It is understood that other pumps or devices do not depart from the scope of this invention.

The first gearset assembly 42 is received in the gearbox 40 and operatively connects the motor output shaft 36 and the drive shaft 38 of the pump for transmitting power from the output shaft to the drive shaft. The gearset assembly 42 produces a first rotational speed adjustment between the shafts such that the drive shaft 38 rotates at a different rotational speed than the motor output shaft 36 and carries a different torque. The adjustment depends on the arrangement and size of gears in the gearset assembly. Typically, the adjustment is a reduction in rotational speed and corresponding increase in torque. However, it is understood that the gears can be arranged so that the adjustment increases output speed while reducing torque, reverses output direction, or is a null adjustment which merely transfers power without substantial change in speed.

Referring to FIGS. 10–13, an embodiment of the first gearset assembly 42 is a planetary gearset which includes a sun gear 94 at the center, several planetary gears 96 (preferably three or four) each having outwardly facing teeth, an outer ring gear 98 enclosing the planetary gears and having inwardly facing teeth engageable by the planetary gears, and a planetary carrier 100 which holds the planetary gears in proper relation with the sun and ring gear. The planetary gears 96 are free to rotate on their own axes while they "walk" around the sun gear 94 inside the ring gear 98. The speed reduction ratio produced by the assembly is typically between 3:1 and 7:1, although it can be outside that range. The sun gear 94 is connected to an externally splined stub shaft 102 extending from one side of the assembly. The stub shaft 102 is supported by the sun gear 94, may be integrally formed with the sun gear, and rotates at the speed of the motor output shaft 36. An internally splined socket 104 is provided on an opposite side of the assembly 42 for connection to the pump. The socket 104 is integrally formed with the carrier 100 and rotates at a speed which has been adjusted by the gearset assembly relative to the speed of the motor output shaft. Fastener holes 106 are located in the outer ring gear 98 for receiving the fasteners 72 to secure the assembly in the gearbox. The aforementioned keyway 82 is positioned in the outer ring gear 98 for receiving the key 80 of the gearbox and preventing rotation of the outer ring relative to the gearbox.

An exemplary gearset assembly is a planetary assembly, specifically Model LGU 75-M sintered metal module which is distributed by Matex Products, Inc. of Cleveland, Ohio., USA. Similar gearset assemblies are disclosed in U.S. Pat. Nos. 4,617,839, 4,674,360, and 5,098,358, each assigned to Matex Co., Ltd. of Osaka, Japan. It is understood that other models and types of gearset assemblies, including non-planetary types, can be used without departing from the scope of this invention.

The second gearset assembly 44 (FIGS. 12 and 13) is receivable in the cavity of the gearbox housing 40 and is operatively connected in series with the first gearset assembly 42 for transmitting power and producing a second rotational speed adjustment. The second gearset assembly 44 is substantially the same as the first assembly 42 (e.g., a planetary gearset assembly), but it has an internally splined central socket 108 for receiving the stub shaft 102 of the first gearset assembly and an oppositely facing central socket 110 for receiving the output shaft 36 of the motor. The gears of the second assembly 44 may be arranged to provide an adjustment in rotational speed which is either the same or different than that provided by the first assembly 42.

An annular spacer 112 (FIGS. 14 and 15) fits between the outer ring gears 98 of the first and second assemblies 42, 44 in direct engagement by the outer rings. The spacer 112 is formed of a suitable rigid material, such as a metal or more preferably a lightweight plastic. The spacer contains a keyway 82 for receiving the key 80 of the gearbox and fastener holes 106 for receiving the fasteners 72.

Figure 9:
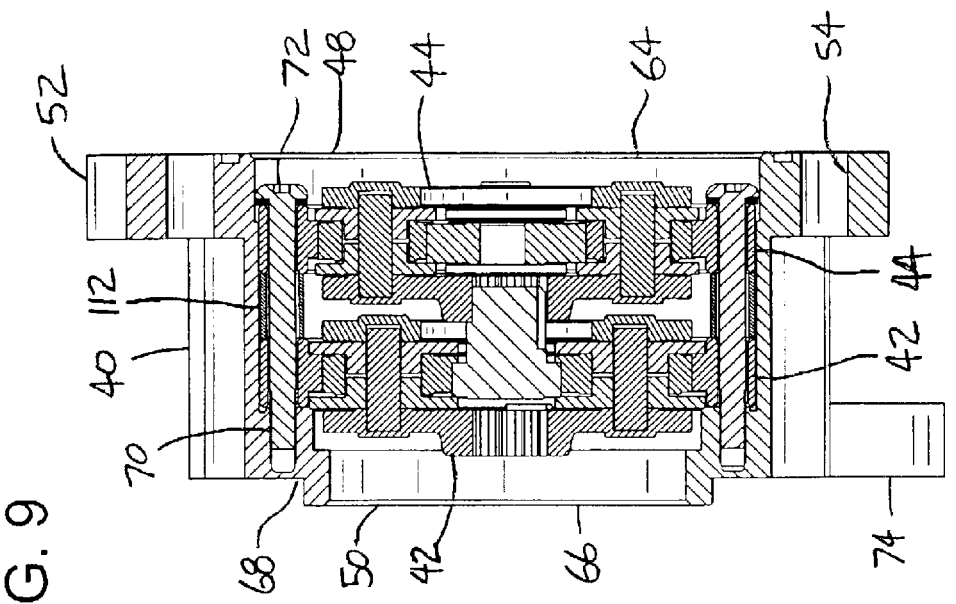
FIG. 9 is a section along line 9—9 of FIG. 8.
Figure 8:
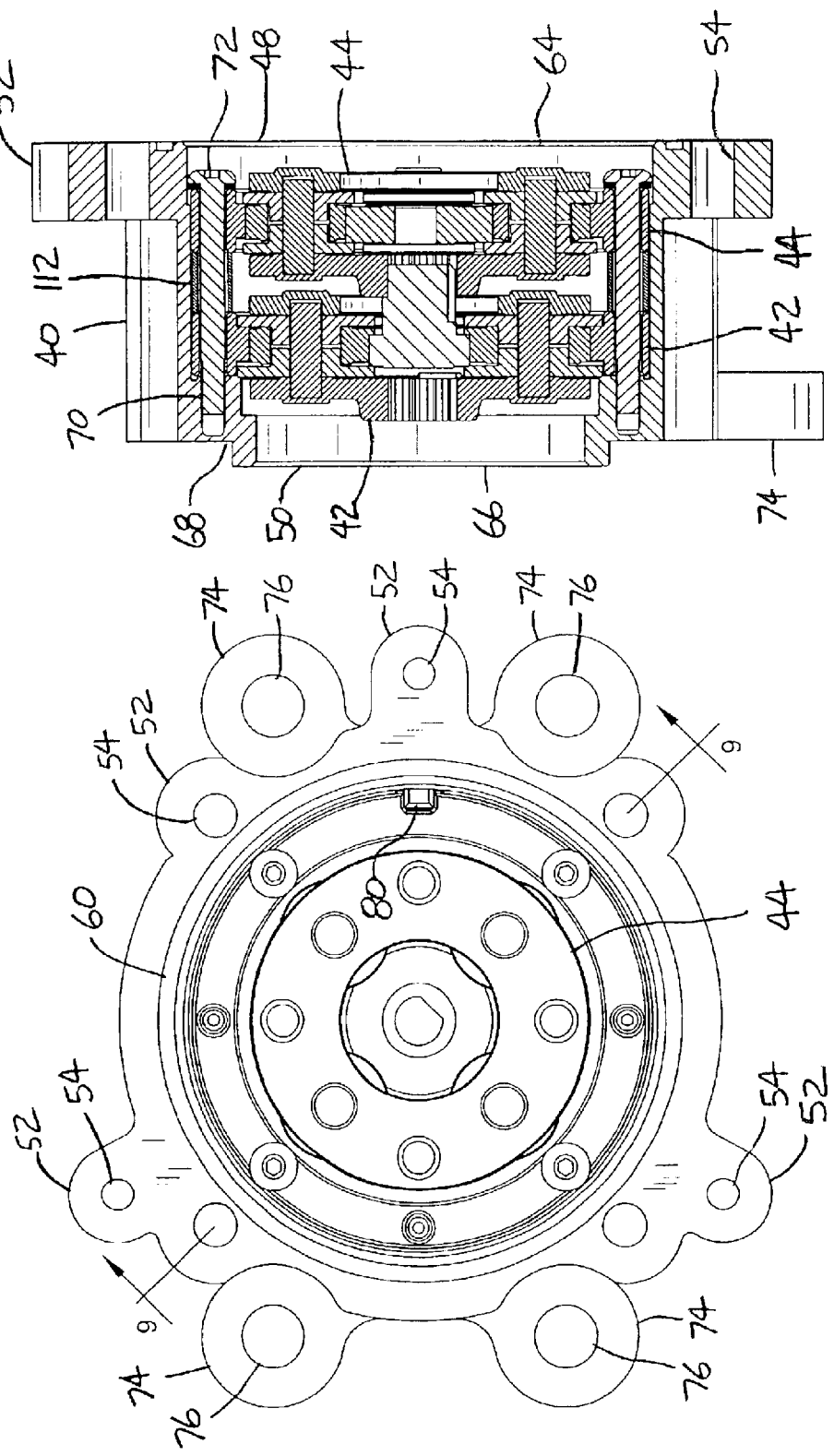
FIG. 8 is an end elevation of the gear system in a multi-stage mode.
Figure 10:
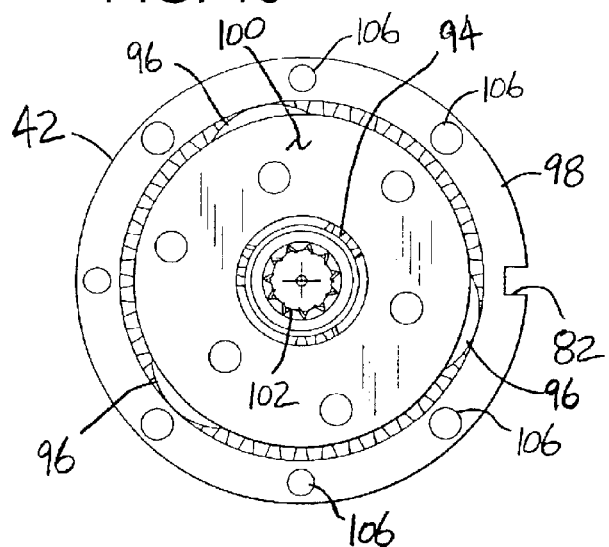
FIG. 10 is an end elevation of a first planetary gearset assembly with parts broken away to reveal internal structure.
Figure 11:
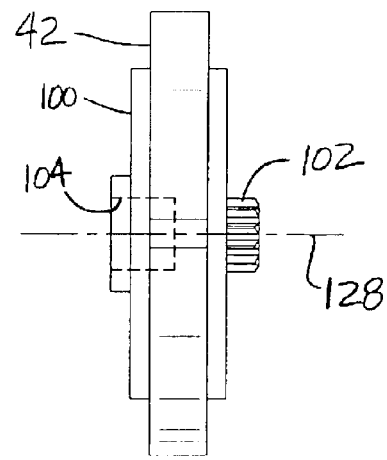
FIG. 11 is a side elevation of the first planetary gearset assembly of FIG. 10.
Figure 12:
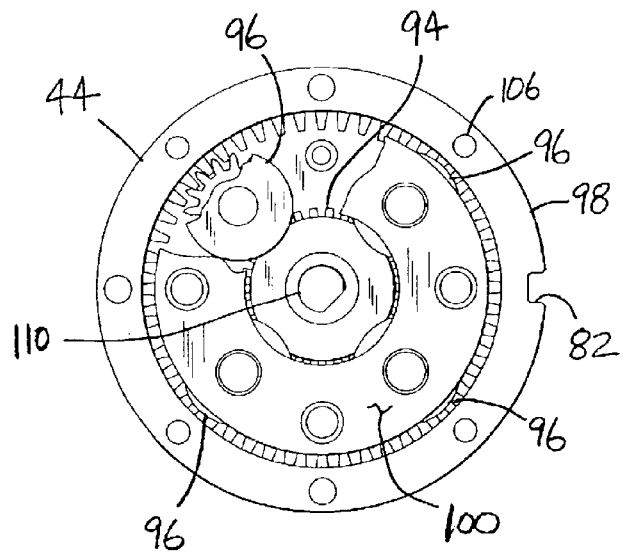
FIG. 12 is an end elevation of a second planetary gearset assembly with parts broken away to reveal internal structure.
Figure 13:
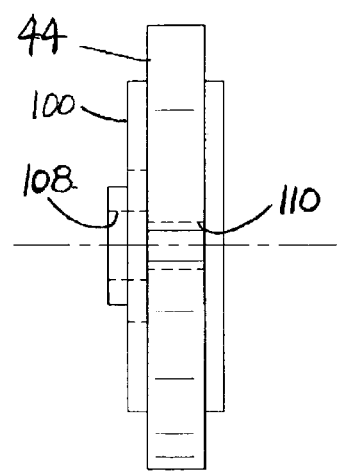
FIG. 13 is a side elevation of the second planetary gearset assembly of FIG. 12.

The system 30 may be configured in different modes. In a first, single-stage mode (FIG. 7), the first gearset assembly 42 and not the second gearset assembly 44 is received in the gearbox 40 to produce the first rotational speed adjustment. In a second, multi-stage mode (FIGS. 5 and 9), both the first and second gearset assemblies 42, 44 are received in the gearbox and are operatively connected in series between the motor output shaft 36 and the drive shaft 38 of the pump to produce a rotational speed adjustment which combines the first and second adjustments. As will be understood by those skilled in the art, the combined reduction ratio is typically a product of the individual stage reduction ratios. The user may select a gearset assembly combination which will produce a reduction ratio corresponding to requirements for a particular functional application of the device requiring power (e.g., pump 34) and/or requirements of a particular motor. It will also be understood that the multi-stage mode could include three or more gearset assemblies in the gearbox without departing from the scope of this invention.

An adapter 114 (FIGS. 16 and 17) connects the output shaft 36 of the motor and the first gearset assembly 42 when the system is configured in the single-stage mode. The adapter 114 comprises a sleeve having opposite ends sized and shaped for receiving the output shaft 36 of the motor and the stub shaft 102 of the first gearset assembly. The adapter 114 has internal splines 116, and may have any suitable external shape. Significantly, the cavity of the gearbox 40 in the single-stage mode contains only one gearset. That provides for lower weight and more reliable operation relative to a single-stage system wherein the gearbox contains two or more gearsets but only one of the gearsets is selected to be engaged and fully operational.

Figure 19:
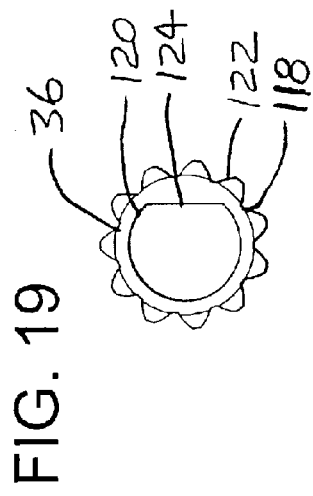
FIG. 19 is an end elevation of an output shaft of the motor.
Figure 18:
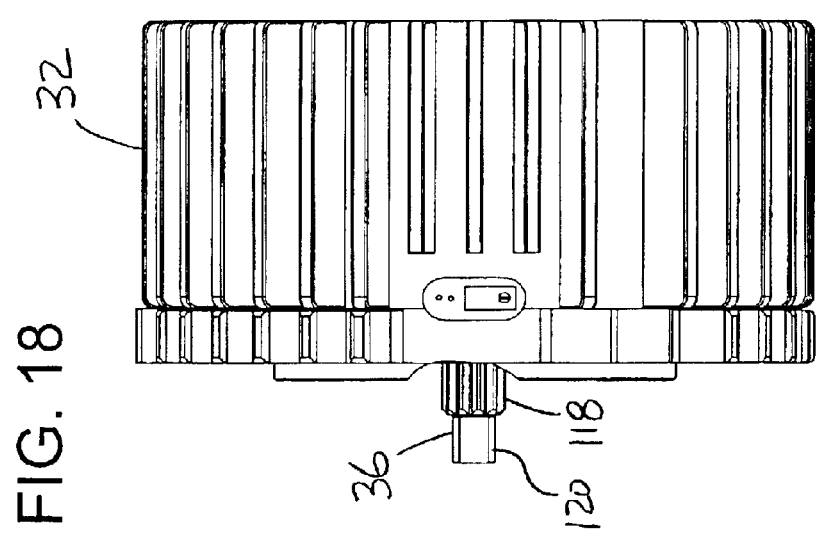
FIG. 18 is a side elevation of the motor.

Referring to FIGS. 18 and 19, the output shaft 36 of the motor has a first coupling portion 118 for engaging the gear system 30 and transferring power to the gear system when configured in the single-stage mode and a second coupling portion 120 for engaging the gear system and transferring power to the gear system when configured in the multi-stage mode. The first coupling portion 118 of the output shaft comprises a segment of the shaft having external splines 122 which are engageable with the internal splines 116 of the adapter 114.

The second coupling portion 120 of the output shaft comprises a segment of the shaft having a flat surface 124 on one side. The segment is generally circular in cross section but for the flat surface 124. That cross sectional shape corresponds with the central socket 110 of the second gearset assembly 44 for reception therein. The second coupling portion 120 is positioned farther from the motor 32 than the first coupling portion 118. By the provision of the first and second coupling portions, the motor may be attached to the gear system without regard to the mode of the gear system and may be interchangeably used with different modes.

Figure 20:
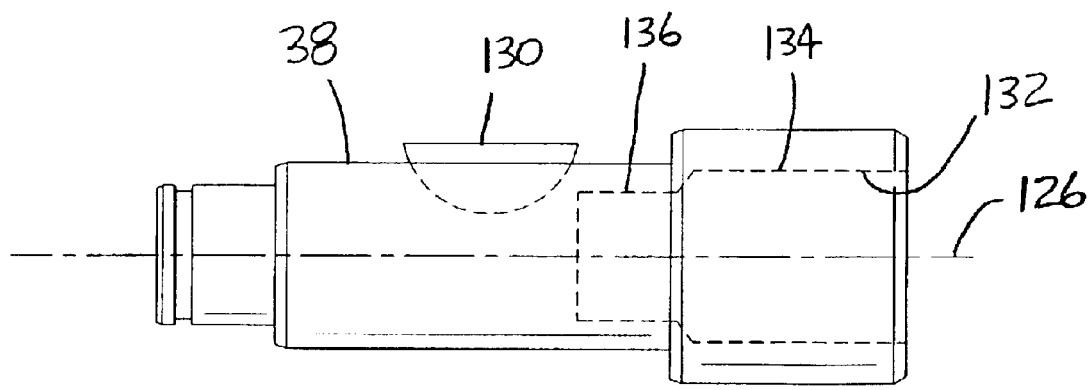
FIG. 20 is a side elevation of a drive shaft of the pump.

The drive shaft 38 (FIG. 20) of the pump of the preferred embodiment is rotatable about a central axis 126 corresponding with a gearset axis 128 (FIG. 11) of the first gearset assembly 42. The drive shaft 38 has a stepped cylindrical shape with a key 130 for connection with the eccentric 92 in the pump. A socket 132 (FIG. 20) is located in an end of the drive shaft. The socket 132 has a wider portion 134 and a narrower portion 136, with at least the narrower portion being splined. The central axis 126 and gearset axis 128 are generally aligned and should ideally be coincident. However, buildup of tolerance of the various parts of the motor, gear system, and pump can lead to slight deviations from the intended alignments. In practice, the central axis and gearset axis have been separated by as much as 0.012 inches.

Figure 21:
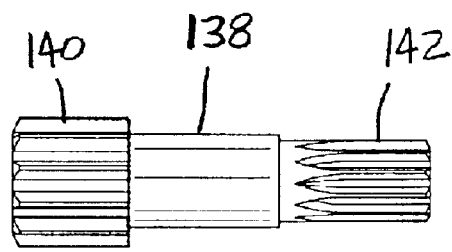
FIG. 21 is a side elevation of a connector for connecting the first gearset assembly and the drive shaft of the pump.
Figure 23:
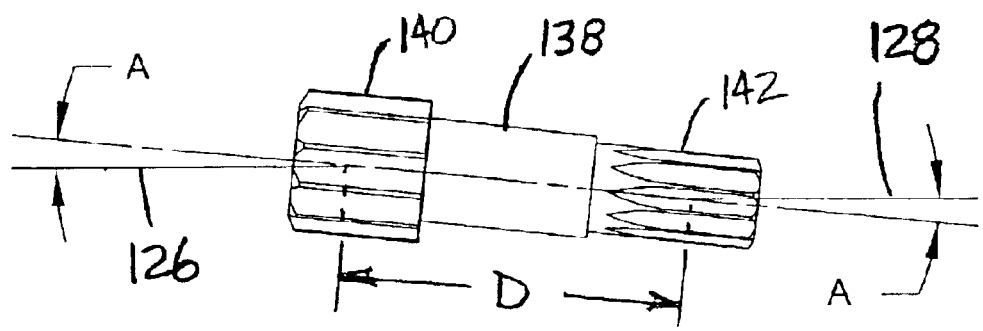
FIG. 23 is a schematic view showing the connector spanning misalignment between the first gearset assembly and the drive shaft.

A connector 138 comprising, in one embodiment, a connecting shaft (FIG. 21) connects the first gearset assembly 42 and the drive shaft 38 and tends to compensate for misalignments between the central axis 126 and the gearset axis 128. The connecting shaft has a first drive portion 140 adjacent one end for engaging the drive shaft 38 and a second drive portion 142 adjacent its opposite end for engaging the first gearset assembly 42. The first drive portion 140 is externally splined and sized for reception in the socket 132 of the pump drive shaft, specifically in the narrower portion 136 of the socket. The second drive portion 142 is externally splined and sized for reception in the socket 104 of the first gearset assembly 42. The first and second drive portions are spaced from one another by an axial distance D (FIG. 23). For example, this spacing D may be in the range of 0.5–3.0 inches, and more preferably about 1.5 inches.

When the central axis 126 of the pump drive shaft and the gearset axis 128 are misaligned, the connecting shaft 138 spans the misalignment. The axial spacing on the connector tends to reduce an angle A (shown schematically and exaggerated in FIG. 23) which forms between the connector 138 and the axes 126, 128, providing a smaller angle than that which would be formed by a connector without significant axial spacing. For example, in one embodiment the axial spacing of the connector 138 reduces the angle A from between 2.0 and 3.5 degrees to 0.4 degrees. That tends to reduce radial "wobble" in the system as it rotates, inhibits relative motion between engaging parts, facilitates self-alignment, and reduces wear on the connector, drive shaft, and gearset assembly. Consequently, the connector 138 improves durability and reliable operation.

In use, the gear system 30 of the present invention is adaptable for permitting selection of a wide range of reduction ratios and a diverse group of motor types. The single-stage mode or multi-stage mode may be chosen, with a gearset assembly or assemblies of desired reduction ratio.

If it is necessary to change the mode of operation to alter a rotational speed adjustment provided by the gear system, the gearbox 40 is unfastened from the motor 32 to provide access to the cavity. The user can then increment the number of gear stages by installing a gearset assembly in series arrangement with a gearset assembly 42 already received in the cavity. Alternatively, the user can decrement the number of gear stages by removing a gearset assembly from the cavity to decrease the rotational speed adjustment provided by the gear system. The user then couples the output shaft 36 of the motor with a gearset assembly in the cavity. When more than one gearset assembly is installed in the cavity, the output shaft of the motor is inserted directly into a corresponding central socket 110 in a gearset assembly. When a single gearset assembly remains in the cavity, the intermediate adapter 114 is used to connect the output shaft 36 of the motor with the stub shaft 102 of the first gearset assembly 42. The user then re-fastens the gearbox 40 to the motor 32. If the user also wishes to replace the motor, such as switching from a DC motor 32 to an AC motor 58, or vice versa, the gearbox may be readily connected to the new motor with fasteners placed in different mounting formations 52 corresponding with the new motor.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A modular gear system for transmitting power from a motor having a rotary output shaft to a device which requires power and has a rotary drive shaft, the system comprising:
    a gearbox adapted to be mounted generally adjacent said motor and said device, said gearbox defining a cavity;
    a first gearset assembly receivable in said cavity and operatively connectable between the motor output shaft and the drive shaft of the device for transmitting power from the output shaft to the drive shaft and producing a first rotational speed adjustment between the shafts such that the drive shaft rotates at a different rotational speed than the motor output shaft; and
    a second gearset assembly receivable in said cavity and operatively connectable in series with the first gearset for transmitting power and producing a second rotational speed adjustment;
    wherein the system may be configured in either 1) a single-stage mode wherein the first gearset assembly and not the second gearset assembly is received in the cavity to produce the first rotational speed adjustment, or 2) a multi-stage mode wherein both the first and second gearset assemblies are received in the cavity and are operatively connected in series between the motor output shaft and the drive shaft of the device to produce a rotational speed adjustment which combines the first and second adjustments.

2. A modular gear system as set forth in claim 1 in combination with said device, and wherein the device is a pump.

3. The combination as set forth in claim 2 wherein the pump is reciprocally movable through a pump stroke and has a lance for extending into a supply of a pumpable product for pumping the product.

4. The combination as set forth in claim 3 wherein the pump has a pump housing having an integral mounting formation to which the gearbox can be fastened.

5. A modular gear system as set forth in claim 1 in combination with the output shaft of the motor, and wherein the output shaft has a first coupling portion for engaging the gear system and transferring power to the gear system when configured in the single-stage mode and a second coupling portion for engaging the gear system and transferring power to the gear system when configured in the multi-stage mode.

6. A modular gear system as set forth in claim 5 wherein the first coupling portion of the output shaft comprises a segment of the shaft having external splines.

7. A modular gear system as set forth in claim 6 further comprising an adapter for connecting the output shaft of the motor and the first gearset assembly when the system is configured in the single-stage mode.

8. A modular gear system as set forth in claim 7 wherein the adapter comprises a sleeve having opposite ends sized and shaped for receiving the output shaft of the motor and a gear of the first gearset assembly, the sleeve having internal splines engagable with the external splines on said output shaft.

9. A modular gear system as set forth in claim 5 wherein the second coupling portion of the output shaft comprises a segment of the shaft having a flat thereon.

10. A modular gear system as set forth in claim 1 wherein the drive shaft of the device is rotatable about a central axis, and wherein the first gearset assembly is rotatable about a gearset axis, the central axis and gearset axis being generally aligned and coincident.

11. A modular gear system as set forth in claim 10 further comprising a connector for connecting the first gearset assembly and the drive shaft of the device and transmitting power and rotary motion therebetween, the connector being configured to compensate for misalignments between the central axis and the gearset axis.

12. A modular gear system as set forth in claim 11 wherein the connector comprises a shaft segment having a first drive portion for engaging the drive shaft and a second drive portion for engaging the first gearset assembly, and wherein the first and second drive portions are located generally at opposite ends of the shaft segment in spaced relation defining an axial spacing therebetween, such that when the central axis and gearset axis are misaligned, the connector spans the misalignment.

13. A modular gear system as set forth in claim 12 wherein said axial spacing between said first and second drive portions is at least about 1.5 inches.

14. A modular gear system as set forth in claim 12 wherein the drive shaft has a socket and wherein the first drive portion is configured for reception in the socket to engage the drive shaft.

15. A modular gear system as set forth in claim 14 wherein the socket is internally splined and the first drive portion of the connector is externally splined.

16. A modular gear system as set forth in claim 1 wherein the gearbox has fastener openings for mounting the gearbox to the motor, said openings including openings arranged in two different mounting configurations corresponding to two different motors.

17. A modular gear system as set forth in claim 16 wherein one of said two mounting configurations is adapted to mount an AC motor and the other is adapted to mount a DC motor.

18. A modular gear system as set forth in claim 1 wherein said gearbox comprises a housing common to both first and second gearset assemblies.

19. A modular gear system as set forth in claim 18 wherein the housing has a cylindrical wall extending the full depth of the cavity.

20. A method of changing a mode of operation of a gear system to alter a rotational speed adjustment provided by the gear system in transmitting power between a rotary output shaft of a motor and a rotary drive shaft of a device which requires power, the gear system comprising a gearbox fastened to the motor defining a cavity containing at least one gearset assembly, the method comprising the steps of:
    unfastening the gearbox from the motor to provide access to the cavity; changing the rotational speed adjustment provided by the gear system by installing in the cavity one of more gearset assemblies in series with said at least one gearset assembly to thereby increment a number of gear stages, or by removing at least one gearset assembly of two or more gearset assemblies from the cavity to thereby decrement a number of gear stages;
    coupling a gear assembly in the cavity with the output shaft of said motor or an output shaft of a different motor; and
    fastening the gearbox to said motor or to said different motor.

21. A method as set forth in claim 18 further comprising replacing said motor or said different motor prior to said coupling step.

22. A method as set forth in claim 19 wherein the step of replacing the motor comprises switching between AC and DC motors.

23. A method as set forth in claim 18 wherein the step of coupling a gear assembly with the output shaft of the motor comprises inserting a portion of the output shaft directly into a corresponding opening in a gearset assembly when more than one gearset assembly is received in the cavity, and installing an intermediate adapter to connect the output shaft of the motor with a gearset assembly when only one gearset assembly remains in the cavity.

24. A method as set forth in claim 18 further comprising connecting one of said gearset assemblies and the drive shaft of the device by using a connector configured to compensate for misalignments between said one gearset assembly and the drive shaft.

* * * * *